Patented Nov. 8, 1949

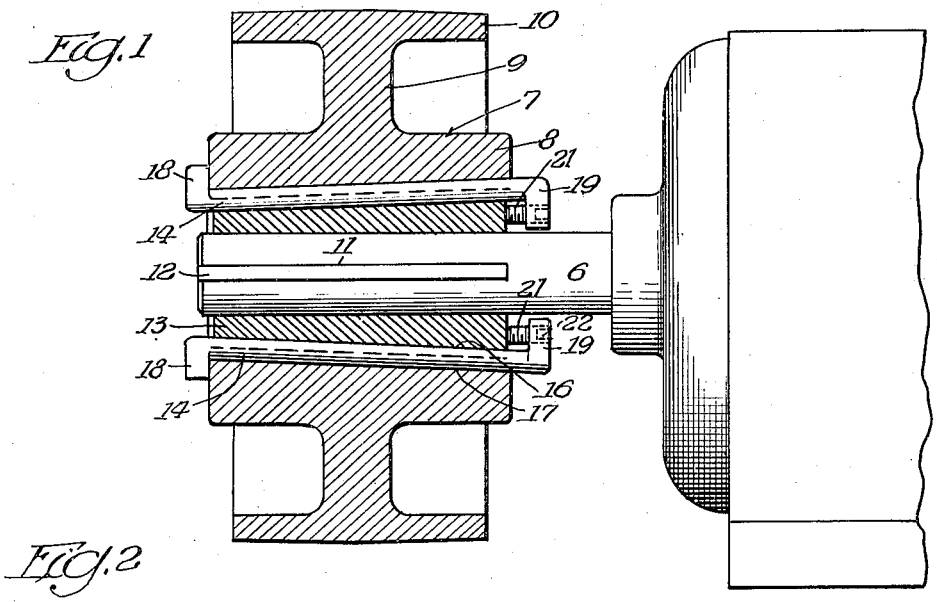
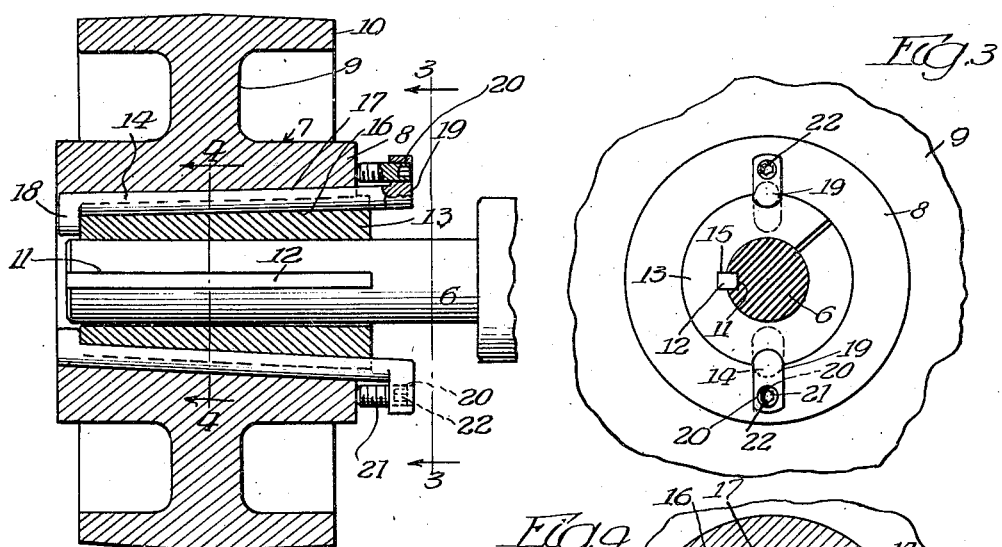
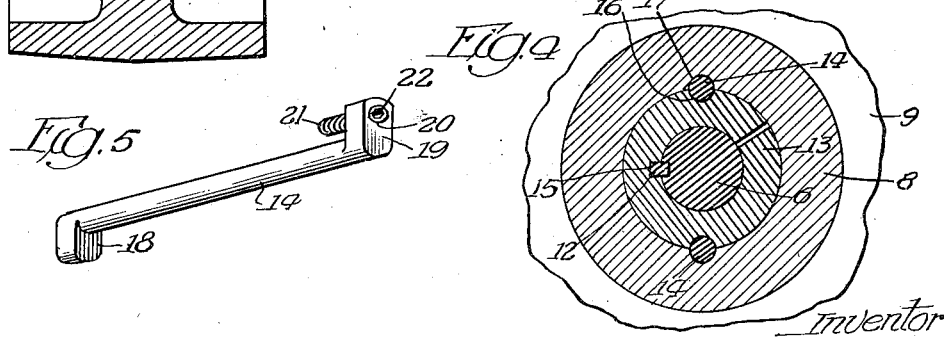

2,487,225

UNITED STATES PATENT OFFICE 2,487,225

SHAFT-PULLEY COUPLING OF THE LONGITUDINALLY SPLIT-TAPERED SLEEVE TYPE

Maurice F. Dunne, Chicago, Ill.

Application May 15, 1947, Serial No. 748,288

8 Claims. (Cl. 287—52.06)

1

The present invention relates generally to couplings. More particularly the invention relates to that type of coupling which is adapted to be interposed between a shaft and the hub of a pulley or like rotary part, serves when in its operative position to connect the shaft and pulley for conjoint rotation, and comprises in addition to a longitudinally split sleeve having a cylindrical shaft-engaging inner periphery and a uniformly tapered outer periphery for engagement with the inner periphery of the hub, means whereby the sleeve may be selectively slid relatively to the pulley hub either in the direction of its small end in order to effect contraction thereof around the shaft and bring it into wedged or operative relation with the shaft and hub or in the direction of its large end in order to release it together with the pulley from the shaft.

One object of the invention is to provide a coupling of this type which is an improvement upon, and has certain inherent advantages over, previously designed couplings and is characterized by the fact that the means for selectively sliding the sleeve in either direction relatively to the pulley hub embodies parts which are simple in design and construction, serve to key the pulley hub to the sleeve, and are capable of being manipulated for sleeve sliding purposes with ease or facility.

Another object of the invention is to provide a shaft-pulley coupling of the last mentioned character in which the parts of the sleeve sliding means consist of cylindrical pins which are mounted respectively in pairs of opposed complemental semi-cylindrical grooves in the outer periphery of the sleeve and the inner periphery of the pulley hub, have radially extending lugs at certain ends thereof, and embody at the other ends radially extending lugs which are disposed at an angle of 180° with respect to the first mentioned lugs and carry at their outer ends screws in substantially parallel relation with the pins.

A further object of the invention is to provide a coupling of the type and character under consideration which is generally of new and improved construction, effectively and efficiently fulfills its intended purpose and is so designed that it may be produced at a comparatively low cost.

Other objects of the invention and the various advantages and characteristics of the present

2 coupling will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a view partly in longitudinal section and partly in side elevation, showing a coupling embodying the invention in its operative position with respect to a shaft and a pulley;

Figure 2 is a similar view except that it shows the lug equipped pins positioned so that in connection with tightening of the screws they serve to shift the sleeve with respect to the pulley hub in the direction of its large end and thus effect release of the sleeve together with the pulley from the shaft;

Figures 3 and 4 are vertical transverse sections taken respectively on the lines 3—3 and 4—4 of Figure 2; and Figure 5 is a perspective of one of the lug equipped pins constituting the means for selectively sliding the sleeve in either direction with respect to the hub of the pulley with which the coupling is associated.

The coupling which is shown in the drawing constitutes the preferred form or embodiment of the invention. It is illustrated in connection with a shaft 6 and a pulley 7 and serves, as described more in detail hereafter, releasably to connect the shaft and pulley for conjoint rotation. The shaft 6 is disclosed as the armature shaft of an electric motor, although, so far as the present coupling is concerned, it may be any other sort of a shaft. The pulley 7 represents merely one type of a rotary part with which the coupling may be used. It is illustrated in the drawing as being conventional and comprising a hub 8, a body 9 and a rim 10. The hub of the pulley surrounds and is in concentric relation with the shaft and has a uniformly tapered or frusto-conical inner periphery. The shaft 6 is cylindrical throughout the zone thereof that is surrounded by the hub of the pulley, and has a longitudinal key-way 11. The inner portion of a key 12 is seated or disposed in this key-way. Preferably the key-way and key are polygonal in cross section. The diameter of the shaft 6 is less than the diameter of the small end of the tapered inner periphery of the pulley hub 8. As its component parts the coupling comprises a longitudinally split sleeve 13 and a plurality of pins 14.

The sleeve 13 of the coupling has a cylindrical inner periphery and a uniformly tapered outer periphery. The split in the sleeve extends from one end of the sleeve to the other in order that the sleeve is contractible. As shown in the drawing, the sleeve is interposed between the shaft 6 and the hub of the pulley. When the sleeve is not contracted the diameter of its inner periphery is greater than the diameter of the shaft. The angle of taper of the outer periphery of the sleeve is the same as that of the inner periphery of the hub of the pulley. The sleeve has an internal, longitudinally extending, full length keyway 15 for the outer portion of the key 12. When the sleeve 13 is in its operative position, as shown in Figure 3, the key 12 forms a driving connection whereby the sleeve and shaft are keyed together for conjoint rotation. The sleeve when in its operative position is arranged so that the small end thereof faces or projects in the same direction as the small end of the uniformly tapered inner periphery of the hub of the pulley. When the sleeve is slid longitudinally with respect to the pulley in the direction of its small end it is contracted around the shaft and brought into such wedged relation with the hub 8 that the pulley, through the medium of the sleeve, is connected for conjoint drive with the shaft. When the sleeve is shifted longitudinally with respect to the pulley in the direction of its large end it expands out of gripping relation with the shaft and releases the pulley so that it may be slid longitudinally with respect to the shaft or removed from the shaft.

The pins 14 have a twofold purpose in that they serve to key the pulley hub to the sleeve and constitute means whereby the sleeve may be selectively shifted or slid longitudinally in either direction with respect to the hub of the pulley. They are shown as being two in number although it is to be understood that a single pin or more than two pins may be employed, if so desired. Preferably the pins are in the form of steel forgings. As shown in the drawing the pins are identical and their individual length is slightly greater than the length of the sleeve 13. Each of the pins 14 is mounted in a pair of opposed, complemental semi-cylindrical grooves 16 and 17. The grooves 16 extend throughout the full or entire length of the sleeve 13 and are formed in the outer tapered periphery of the sleeve. The grooves 17 are formed in the inner tapered periphery of the pulley hub 8 and extend from one end of the hub to the other. The ends of the pins that are adjacent the small end of the sleeve are provided with integral radially extending lugs 18 and the other ends of the pins are provided with integral radially extending lugs 19. The last mentioned lugs are disposed at an angle of 180° with respect to the lugs 18 and have in the outer ends thereof screw threaded holes 20. Such holes are disposed in substantially parallel relation with the pins and extend completely through the lugs. Screws 21 are associated with, and extend through, the holes 20 and have in the outer ends thereof polygonal sockets 22 whereby they may be turned by way of a wrench (not shown) of the type that comprises an L-shaped polygonal rod. The inner ends of the screws 21 are adapted to abut against either the adjacent end face of the sleeve or the adjacent end face of the pulley hub, depending upon whether the lugs 19 are positioned as shown in Figure 1 or as shown in Figure 2. When the pins are arranged as shown in Figure 1, i. e., so that the lugs 18 extend outwards and lap or abut against the adjacent end face of the pulley hub 8 and the lugs 19 extend inwards and are positioned in opposed and spaced relation with the adjacent end face of the sleeve, tightening of the screws 21 results in the sleeve being slid relatively to the pulley in the direction of its small end. This is attributable to the fact that since the pins are held against movement in the direction of the large end of the inner tapered periphery of the pulley hub due to abutment of the lugs 18 against the adjacent end face of the hub, the screws when tightened feed toward the lugs 18 and hence slide the sleeve in the direction of its small end. As hereinbefore described, such sliding movement on the part of the sleeve results in the sleeve being brought into its operative position wherein it is contracted around the shaft and is in firmly wedged relation with the shaft and the pulley hub. When the pins 17 are positioned as shown in Figure 2, i. e., so that the lugs 18 thereof extend inwards into abutting or lapped relation with the adjacent end face of the sleeve and the lugs 19 extend outwards into a position wherein they are opposite and in spaced relation with the adjacent end face of the pulley hub, tightening of the screws 21 results in the pins together with the sleeve 13 being slid or shifted longitudinally with respect to the pulley hub in the direction of the large end of the sleeve. Such sliding movement on the part of the sleeve releases the sleeve from its normal operative position and permits longitudinal displacement of the pulley with respect to the shaft or removal of the pulley from the shaft.

When it is desired to assemble the coupling the sleeve 13 is slid onto the shaft. Thereafter the pins 14 are seated in the semi-cylindrical grooves 16 and are turned or manipulated into such position that the lugs 18 extend inwards and the lugs 19 extend outwards. After such manipulation of the pins the pulley is slid onto the sleeve 13. In connection with such sliding movement of the pulley the hub of the pulley is positioned in concentric relation with the sleeve and turned or positioned so that the grooves 17 therein are aligned with the grooves 16. After sliding the pulley into place the pins 14 are rotated 180° into the position shown in Figure 1 wherein, as previously pointed out, the lugs 18 extend outwards and lap the adjacent end face of the pulley hub and the lugs 19 extend inwards and are spaced outwards from the adjacent end face of the sleeve. As soon as the pins are so positioned the screws 21 are tightened so as to slide the sleeve into wedged relation with the shaft and the pulley hub and thus render the coupling operative. When the coupling is in its operative position the pulley is held in rigid relation with the shaft. In the event that it is desired to reset the pulley on the shaft or remove the pulley from the shaft the screws 21 are unscrewed or released and the pins are then turned throughout an arc of 180° into the position shown in Figure 2 wherein, as previously pointed out, the lugs 18 extend inwards and abut against the adjacent end face of the sleeve and the lugs 19 extend outwards and are disposed in opposed and spaced relation with the adjacent end face of the hub 8 of the pulley. After so turning the pins the screws are tightened. In connection with tightening of the screws after the inner ends of the screws are in engagement with the adjacent end face of the pulley hub the sleeve 13 is caused to slide relatively to the pulley in the direction of its large end. Such sliding movement effects release of the sleeve and thus frees the pulley so that it may be adjusted longitudinally with respect to the shaft 6 or removed from the shaft. It is contemplated that when the coupling is in its operative position as shown in Figure 1 the screws will remain in their tightened position wherein the inner ends thereof are in abutment with the large end of the sleeve. By permitting the screws to remain tightened the pins will be held against rotation as well as axial displacement with respect to the sleeve and the pulley hub.

The herein described coupling effectively and efficiently fulfills its intended purpose and this is directly attributable to the fact that it embodies the lug equipped pins 14 in addition to the sleeve 13. It may be manipulated into and out of its operative position with facility and, due to the construction and design thereof, may be produced at a comparatively low cost.

The invention is not to be understood as restricted to the details set forth since these may be modified within the scope of the appended claims without departing from the spirit and scope of the invention.

Having thus described the invention what I claim as new and desire to secure by Letters Patent is:

1. As a new article of manufacture, a coupling adapted for use in connection with a shaft part and a rotary wheel-like element with a hub part extending concentrically around the shaft part, one of the two parts having adjacent the other part a tapered periphery, said coupling comprising a longitudinally split sleeve extending around the shaft part and within the hub part, having the periphery thereof that is adjacent the tapered periphery of the one part tapered in conformity with such tapered periphery, and adapted when slid relatively to the hub part in the direction of its small end to be brought into wedged and gripping relation with the shaft and hub parts and when slid relatively to the hub part in the direction of its large end to release the hub part with respect to the shaft part, and a rotatably mounted pin extending longitudinally of, and disposed adjacent the opposed peripheries of, the sleeve and hub part and embodying at one end thereof a lug extending radially in one direction and at its other end a lug extending radially in the opposite direction and provided at its outer end with means adapted to feed inwards or outwards with respect to the adjacent end face of the sleeve or the adjacent end face of the hub part depending upon whether the second mentioned lug is positioned so that it extends inwards or outwards, said pin being adapted when turned and manipulated so that the first mentioned lug extends outwards and abuts against the adjacent end face of the hub part and the second mentioned lug extends inwards in opposed relation with the adjacent end of the sleeve and in conjunction with inward feed of said means to slide the sleeve in one direction with respect to the hub part, and being further adapted when turned and manipulated so that said first mentioned lug extends inwards and abuts against the adjacent end face of the sleeve and said second mentioned lug extends outwards in opposed relation with the adjacent end face of the hub part and in conjunction with inward feed of said means to shift the sleeve in the opposite direction with respect to said hub part.

2. As a new article of manufacture, a coupling adapted for use in connection with a shaft part and a rotary wheel-like element with a hub part extending concentrically around the shaft part, one of the two parts having adjacent the other part a tapered periphery, said coupling comprising a longitudinally split sleeve extending around the shaft part and within the hub part, having the periphery thereof that is adjacent the tapered periphery of the one part tapered in conformity with such tapered periphery, and adapted when slid relatively to the hub part in the direction of its small end to be brought into wedged and gripping relation with the shaft and hub parts and when slid relatively to the hub part in the direction of its large end to release the hub part with respect to the shaft part, and a rotatably mounted pin extending longitudinally of, and disposed adjacent the opposed peripheries of, the sleeve and hub part and embodying at one end thereof a lug extending radially in one direction and at its other end a lug extending radially in the opposite direction and provided at its outer end with a screw threaded hole in substantially parallel relation with the pin and a screw extending through the hole, said pin being adapted when turned and manipulated so that the first mentioned lug extends outwards and abuts against the adjacent end face of the hub part and the second mentioned lug extends inwards in opposed relation with the adjacent end of the sleeve and in conjunction with tightening of the screw to slide the sleeve in one direction with respect to the hub part, and being further adapted when turned and manipulated so that said first mentioned lug extends inwards and abuts against the adjacent end face of the sleeve and said second mentioned lug extends outwards in opposed relation with the adjacent end face of the hub part and in conjunction with tightening of the screw to shift the sleeve in the opposite direction with respect to said hub part.

3. As a new article of manufacture, a coupling adapted for use in connection with a shaft and a part with a hub extending concentrically around the shaft and having the inner periphery thereof spaced from the shaft and tapered, said coupling comprising a longitudinally split sleeve extending around the shaft and within the hub, having a shaft-engaging inner periphery and its outer periphery tapered in conformity with the inner periphery of the hub, and adapted when slid relatively to the hub in the direction of its small end to be brought into wedged and gripping relation with the shaft and hub and when slid relatively to the hub in the direction of its large end to release the part with respect to the shaft, and a rotatably mounted pin extending longitudinally of, and disposed adjacent the opposed peripheries of, the sleeve and hub and embodying at one end thereof a lug extending radially in one direction and at its other end a lug extending radially in the opposite direction and provided at its outer end with means adapted to feed inwards or outward with respect to the adjacent end face of the sleeve or the adjacent end face of the hub depending upon whether the second mentioned lug is positioned so that it extends inwards or outwards, said pin being adapted when turned and manipulated so that the first mentioned lug extends outwards and abuts against the adjacent end face of the hub and the second mentioned lug extends inwards in opposed relation with the adjacent end of the sleeve and in conjunction with inward feed of said means to slide the sleeve in one direction with respect to the hub, and being further adapted when turned and manipulated so that said first mentioned lug extends inwards and abuts against the adjacent end face of the sleeve and said second mentioned lug extends outwards in opposed relation with the adjacent end face of the hub and in conjunction with inward feed of said means to shift the sleeve in the opposite direction with respect to said hub.

4. As a new article of manufacture, a coupling adapted for use in connection with a shaft and a part with a hub extending concentrically around the shaft and having the inner periphery thereof spaced from the shaft, tapered, and provided with a longitudinal, full length groove, said coupling comprising a longitudinally split sleeve extending around the shaft and within the hub, having a shaft-engaging inner periphery and its outer periphery tapered in conformity with the inner periphery of the hub and provided with a longitudinal, full length groove opposite the groove in said inner periphery of the hub, and adapted when slid relatively to the hub in the direction of its small end to be brought into wedged and gripping relation with the shaft and hub and when slid relatively to the hub in the direction of its large end to release the part with respect to the shaft, and a pin extending longitudinally of, and fitting within, the two grooves and embodying at one end thereof a lug extending radially in one direction and at its other end a lug extending radially in the opposite direction and provided at its outer end with means adapted to feed inwards or outwards with respect to the adjacent end face of the sleeve or the adjacent end face of the hub depending upon whether the second mentioned lug is positioned so that it extends inwards or outwards, said pin being adapted when turned and manipulated so that the first mentioned lug extends outwards and abuts against the adjacent end face of the hub and the second mentioned lug extends inwards in opposed relation with the adjacent end of the sleeve and in conjunction with inward feed of said means to slide the sleeve in one direction with respect to the hub, and being further adapted when turned and manipulated so that said first mentioned lug extends inwards and abuts against the adjacent end face of the sleeve and said second mentioned lug extends outwards in opposed relation with the adjacent end face of the hub and in conjunction with inward feed of said means to shift the sleeve in the opposite direction with respect to said hub.

5. As a new article of manufacture, a coupling adapted for use in connection with a shaft and a part with a hub extending concentrically around the shaft and having the inner periphery thereof spaced from the shaft, tapered, and provided with a longitudinal, full length groove, said coupling comprising a longitudinally split sleeve extending around the shaft and within the hub, having a shaft-engaging inner periphery and its outer periphery tapered in conformity with the inner periphery of the hub and provided with a longitudinal full length groove opposite the groove in said inner periphery of the hub, and adapted when slid relatively to the hub in the direction of its small end to be brought into wedge and gripping relation with the shaft and hub and when slid relatively to the hub in the direction of its large end to release the part with respect to the shaft, and a pin extending longitudinally of, and fitting within, the two grooves and embodying at one end thereof a lug extending radially in one direction and at its other end a lug extending radially in the opposite direction and provided at its outer end with a screw threaded hole in substantially parallel relation with the pin and a screw extending through the hole, said pin being adapted when turned and manipulated so that the first mentioned lug extends outwards and abuts against the adjacent end face of the hub and the second mentioned lug extends inwards in opposed relation with the adjacent end of the sleeve and in conjunction with tightening of the screw to slide the sleeve in one direction with respect to the hub, and being further adapted when turned and manipulated so that said first mentioned lug extends inwards and abuts against the adjacent end face of the sleeve and said second mentioned lug extends outwards in opposed relation with the adjacent end face of the hub and in conjunction with tightening of the screw to shift the sleeve in the opposite direction with respect to said hub.

6. As a new article of manufacture, a coupling adapted for use in connection with a shaft and a part with a hub extending concentrically around the shaft and having the inner periphery thereof spaced from the shaft, tapered, and provided with a longitudinal, full length groove, said coupling comprising a longitudinally split sleeve extending around the shaft and within the hub, having a shaft-engaging inner periphery and its outer periphery tapered in conformity with the inner periphery of the hub and provided with a longitudinal full length groove opposite the groove in said inner periphery of the hub and adapted when slid relatively to the hub in the direction of its small end to be brought into wedged and gripping relation with the shaft and hub and when slid relatively to the hub in the direction of its large end to release the part with respect to the shaft, and a pin extending longitudinally of, and fitting within the two grooves and embodying at the end thereof that is adjacent the small end of the sleeve a lug extending radially in one direction and at the end thereof that is adjacent the large end of the sleeve a lug extending radially in the opposite direction and provided at its outer end with a screw threaded hole in substantially parallel relation with the pin and a screw extending through the hole, said pin being adapted when turned and manipulated so that the first mentioned lug extends outwards and abuts against the adjacent end face of the hub and the second mentioned lug extends inwards in opposed relation with the large end of the sleeve and in conjunction with tightening of the screw to slide the sleeve in the first mentioned direction with respect to the hub, and being further adapted when turned and manipulated so that said first mentioned lug extends inwards and abuts against the adjacent end face of the sleeve and said second mentioned lug extends outwards in opposed relation with the adjacent end face of the hub and in conjunction with tightening of the screw to shift the sleeve in the second mentioned direction with respect to said hub.

7. As a new article of manufacture, a coupling adapted for use in connection with a cylindrical shaft and a part with a hub extending concentrically around the shaft and having the inner periphery thereof spaced from the shaft, tapered uniformly from end to end and provided with a longitudinal, full length semi-cylindrical groove, said coupling comprising a longitudinally split sleeve extending around the shaft and within the hub, having a cylindrical shaft-engaging inner periphery and its outer periphery tapered in conformity with the inner periphery of the hub and provided with a longitudinal full length semi-cylindrical groove opposite the groove in said inner periphery of the hub, and adapted when slid relatively to the hub in the direction of its small end to be brought into wedged and gripping relation with the shaft and hub and when slid relatively to the hub in the direction of its large end to release the part with respect to the shaft, and a cylindrical pin extending longitudinally of, and fitting within, the two grooves, embodying at one end thereof a lug extending radially in one direction and at its other end a lug extending radially in the opposite direction and provided at its outer end with a screw threaded hole in substantially parallel relation with the pin and a screw extending through the hole, said pin being adapted when turned and manipulated so that the first mentioned lug extends outwards and abuts against the adjacent end face of the hub and the second mentioned lug extends inwards in opposed relation with the adjacent end of the sleeve and in conjunction with tightening of the screw to slide the sleeve with respect to the hub in one direction with respect to the hub, and being further adapted when turned and manipulated so that said first mentioned lug extends inwards and abuts against the adjacent end face of the sleeve and said second mentioned lug extends outwards in opposed relation with the adjacent end face of the hub and in conjunction with tightening of the screw to shift the sleeve in the opposite direction with respect to said hub.

8. As a new article of manufacture, a coupling adapted for use in connection with a cylindrical shaft and a part with a hub extending concentrically around the shaft and having the inner periphery thereof spaced from the shaft, tapered uniformly from end to end and provided with a longitudinal full length semi-cylindrical groove, said coupling comprising a longitudinally split sleeve extending around the shaft and within the hub, having a cylindrical shaft-engaging inner periphery and its outer periphery tapered in conformity with the inner periphery of the hub and provided with a longitudinal full length semi-cylindrical groove opposite the groove in said inner periphery of the hub, and adapted when slid relatively to the hub in the direction of its small end to be brought into wedged and gripping relation with the shaft and hub and when slid relatively to the hub in the direction of its large end to release the part with respect to the shaft, and a cylindrical pin extending longitudinally of, and within, the two grooves, embodying at the end thereof that is adjacent the small end of the sleeve a lug extending radially in one direction and at the end thereof that is adjacent the large end of the sleeve a lug extending radially in the opposite direction and provided at its outer end with a screw threaded hole in substantially parallel relation with the pin and a screw extending through the hole, said pin being adapted when turned and manipulated so that the first mentioned lug extends outwards and abuts against the adjacent end face of the hub and the second mentioned lug extends inwards in opposed relation with the large end of the sleeve and in conjunction with tightening of the screw to slide the sleeve in the first mentioned direction with respect to the hub, and being further adapted when turned and manipulated so that said first mentioned lug extends inwards and abuts against the adjacent end face of the sleeve and said second mentioned lug extends outwards in opposed relation with the adjacent end face of the hub and in conjunction with tightening of the screw to shift the sleeve in said second mentioned direction with respect to said hub.

MAURICE F. DUNNE.

REFERENCES CITED

The following references are of record in the file of this patent:

UNITED STATES PATENTS

| Number | Name | Date |
| --- | --- | --- |
| 349,361 | Roots | Sept. 21, 1886 |
| 681,090 | White | Aug. 20, 1901 |
| 825,428 | Spencer | July 10, 1906 |
| 1,004,203 | Ross | Sept. 26, 1911 |
| 1,561,507 | Clark | Nov. 17, 1925 |